UNITED STATES PATENT OFFICE
PTO – BOYERS, PA DUTY STATION

---

PAGE NOT AVAILABLE

PATENT NUMBER Y9624 FOR THE ISSUE DATE 4 / 28 / 1836 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

UNITED STATES PATENT OFFICE
PTO – BOYERS, PA DUTY STATION

---

PAGE NOT AVAILABLE

PATENT NUMBER X 9624 FOR THE ISSUE DATE 4 1 28 1 1836 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing first page of text

DATA CONVERSION OPERATION
BOYERS, PA

396 X9624

4-28-1836

Isaac Knight, Letters Patent granted, dated March 19. 1829.
Reissued tenth day of July 1834 & Re-Reissued
April 28. 1836. — Being an Impt. in the
Rail road Carriage — Recorded in volume
— 8th — page 105 — of Restored Records.